United States Patent
Skaggs

[19]

[11] Patent Number: 5,845,842
[45] Date of Patent: Dec. 8, 1998

[54] POLYMODAL COLLAPSIBLE PACKAGING CONTAINER

[75] Inventor: Boyd T. Skaggs, Anderson, Ind.

[73] Assignee: Security Packaging, Inc., Flint, Mich.

[21] Appl. No.: 834,321

[22] Filed: Apr. 23, 1997

[51] Int. Cl.⁶ ...................................................... B65D 5/36
[52] U.S. Cl. .............................. 229/117.02; 229/122.28; 229/122.3; 229/122.33; 229/122.34
[58] Field of Search ................. 229/23 R, 23 A, 229/117.02, 117.05, 117.06; 206/600

[56] References Cited

U.S. PATENT DOCUMENTS

| | | | |
|---|---|---|---|
| 4,373,637 | 2/1983 | Shippell | 206/600 |
| 4,606,461 | 8/1986 | Bolton, Sr. | 229/117.02 |
| 4,693,411 | 9/1987 | Snyder. | |
| 4,697,731 | 10/1987 | Snyder. | |
| 4,712,687 | 12/1987 | Silcott et al. | 206/600 |
| 4,949,898 | 8/1990 | Nederveld | 229/117.02 |
| 4,969,559 | 11/1990 | Nederveld | 206/600 |
| 5,301,872 | 4/1994 | Tusing et al. | 229/117.03 |
| 5,601,232 | 2/1997 | Greenlee | 229/117.05 |

*Primary Examiner*—Gary E. Elkins
*Attorney, Agent, or Firm*—Young & Basile, P.C.

[57] ABSTRACT

The invention concerns a re-usable packaging container comprising an open-face tray member, a collapsible sleeve dimensioned when collapsed to fit within the tray member and further is deployable from a collapsed sleeve to an open form, and hinge guide means having first and second hinges connecting the tray member and sleeve. The packaging container permits the sleeve in collapsed form to be deployed and lifted guidably out of the tray member and opened on a hinge-controlled path to a deployment position match-fitted upright in supported relation from within the tray member and further permitting the deployed sleeve to be returned on the hinge-controlled path and caused to be collapsed within the open tray. The invention also concerns a packaging container tray blank having a tray bottom panel formed as a hinge guide intended for assembly of the blank with an attachable sleeve fitted to be stored in the tray in collapsed form or in opened and deployed form from within the tray.

27 Claims, 8 Drawing Sheets

POLYMODAL COLLAPSIBLE PACKAGING CONTAINER

The present invention relates to a re-usable packaging container that is fitted with or without a shipping pallet. The container is economical, is simple to set up and collapse, forms compact units for containment, storage, transportation, and stacking, and is capable of safely accommodating a variety of products for polymodal uses such as containment, loading and unloading, storage and transportation.

BACKGROUND OF THE INVENTION

Collapsible fiberboard containers for use and re-use in the shipment of bulk materials are known from U.S. Pat. Nos. 4,691,859; 4,693,411 and 4,697,731. The containers use an inverted tray-type bottom, a take-out front panel removably telescoped into the bottom and a 3-sided U-shaped body structure telescoped into the tray bottom or a pair of such body structures to form the container body which can be deployed or erected into an open container structure to receive bulk material to be shipped or which can be collapsed in a compact folded configuration for ease in the shipment or storage of the empty container. The containers however are not intended for the shipment of non-bulk material and they also lack means for automatic package deployment and collapse prompting features. The containers also are not intended for the packaging of manufactured articles and products such as hardware, vehicle parts, industrial machinery, electrical and electronic equipment, and similar articles.

U.S. Pat. No. 5,301,872 describes collapsible pallet container apparatus for automatically prompting orientation of a palletized paperboard container between an articulated deployed container position in which articles may be positioned in the container during containment, storage and transportation of the articles. The patent further describes an articulated collapsed position of the sleeve member for minimizing the overall profile of the palletized container when not in use.

SUMMARY OF THE INVENTION

According to the present invention there is provided a deployable and collapsible packaging container comprising in one preferred embodiment an open-face tray having a tray bottom panel; a reversibly collapsible and deployable sleeve dimensioned when collapsed to fit in collapsed form within the tray and, when opened and deployed, to fit in open tray-supported upright form in the tray; and hinge guide means having hinges integrally connecting the tray and sleeve and permitting the sleeve in collapsed form to be opened, deployed and lifted guidably out of the tray member on a hinge-controlled path to an open upright deployment position in tray supported relation in the tray and further permitting the deployed sleeve after use to be returned on said hinge controlled path and caused to be collapsed within the open tray for return, re-use, or storage.

DETAILED DESCRIPTION OF PREFERRED EMBODIMENTS

Figure 1:
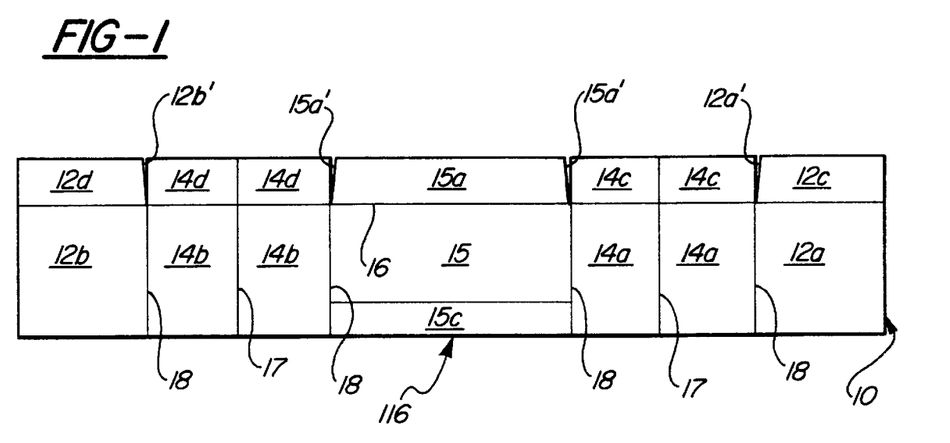
FIG. 1 of the drawings is a plan view of a container sleeve blank of the invention in a preferred embodiment.
Figure 2A:
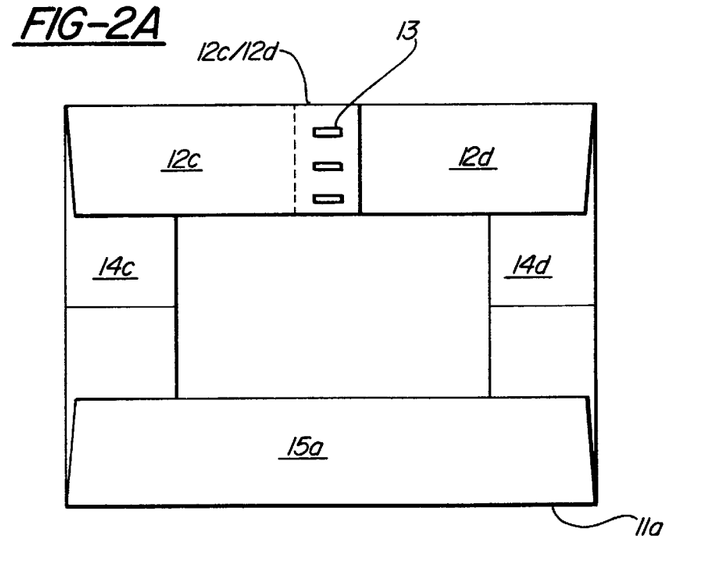
FIG. 2A is a top view of a deployed and assembled open sleeve with peripheral edge flaps.

In a preferred embodiment of the invention an improved container sleeve blank 10 is provided (FIG. 1) having first and second top panels 12a, 12b, first and second end panels 14a, 14b, and a bottom panel 15 which includes segment 15c. The sleeve blank has a lower margin 11b and is formed into an open sleeve 11a having inside and outside surfaces by joining or securing together the opposing ends 12a, 12b of the first and second top panels, preferably by an overlap 12c/12d with 12c over 12d as illustrated in FIG. 2A using fastening means such as staples 13, adhesive or other conventional means or combinations thereof. The sleeve formed from the blank 10 has a peripheral fold line or score line 16 that is intersected at right angles by marginal fold lines 17, 18. The score/fold line enables the folding of panel edge flaps 12c, 12d, 14c, 14d, 15a at right angles away from the respective top, side and bottom panels 12a, 12b, 14a, 14b, 15 such as illustrated in FIG. 2A. FIG. 2A shows the edge flap 15a and the edge flaps 12c, 12d serving respectively as stiffening cross-members to provide stability and to prevent the open sleeve from collapsing. The sleeve 11 includes collapsible end panels 14a, 14b each bisected by a fold line or score line 17.

Certain margins (12a',12b',15a' of the sleeve blank are canted to facilitate folding of the respective edge flap panels. Corrugated fiberboard or an equivalent material is a preferred material for the container sleeve blank.

Figure 2B:
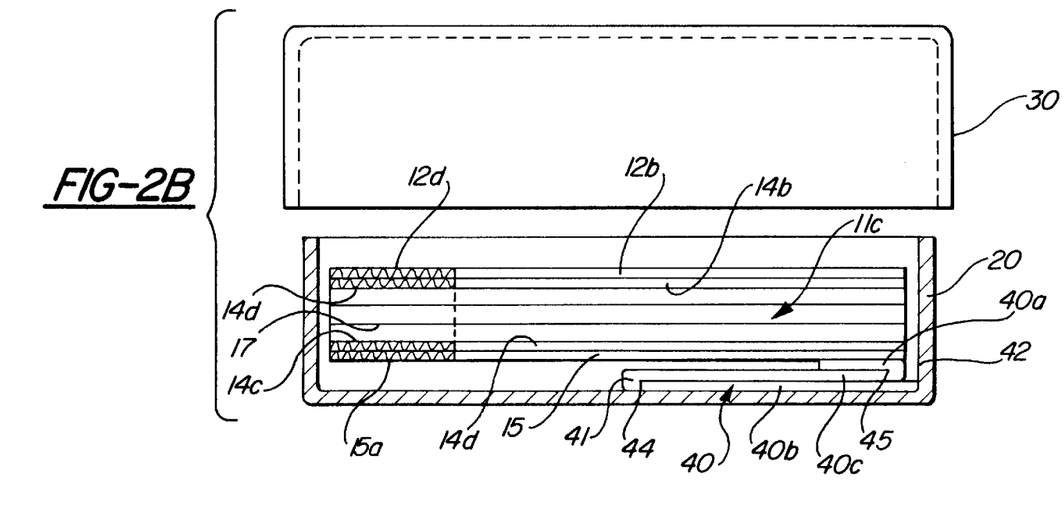
FIG. 2B is an end view of a collapsed sleeve and hinge guide in a form suitable for containment in the cavity afforded by paired telescopically engagable open-face cover and tray members of the invention (the tray being cut away on line 2B—2B of FIG. 2C to show the sleeve and hinge guide)
Figure 2C:
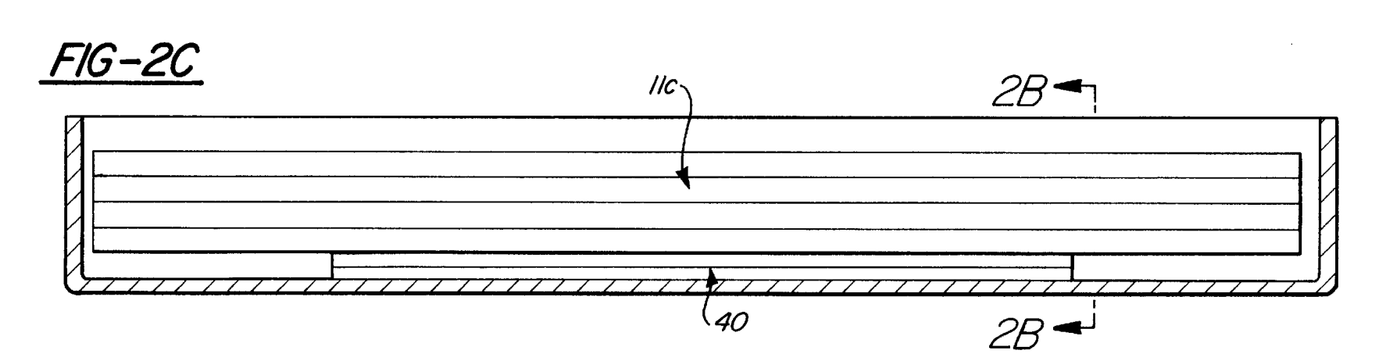
FIG. 2C is a side view of the collapsed sleeve member and hinge guide means in a tray as in FIG. 2B.

An improved packaging container is provided in a preferred embodiment (FIG. 2B) containing a collapsed sleeve 11c, a hinge guide 40 in an open-face tray 20. The tray has inside and outside surfaces, and the sleeve includes a top panel 12a, 12b, end panels 14a, 14b, a bottom panel 15 which includes a bottom panel segment 15c, and a hinge guide 40 having hinges 41, 42 collapsed within a cavity enclosed by the tray, and an optional telescopically joinable tray cover 30. As seen in FIG. 2C, the height of the collapsed sleeve 11c and of the collapsed hinge guide 40 is the same as that of the sleeve and the hinge guide of the end view FIG. 2B, the total height of both being within the depth of the open tray, e.g., 3 inches. The side view FIG. 2C is that of the tray length side which is longer than the width of the FIG. 2B tray which measures, e.g., 16×20 inches. The collapsed sleeve 11c is of a size that can be conveniently hingeably guided into and out of the inside cavity of the tray. A preferred width of the hinge guide 40 is about 12 inches pivoted off the midwidth and centered on the midlength of the tray cavity, as illustrated.

Figure 3:
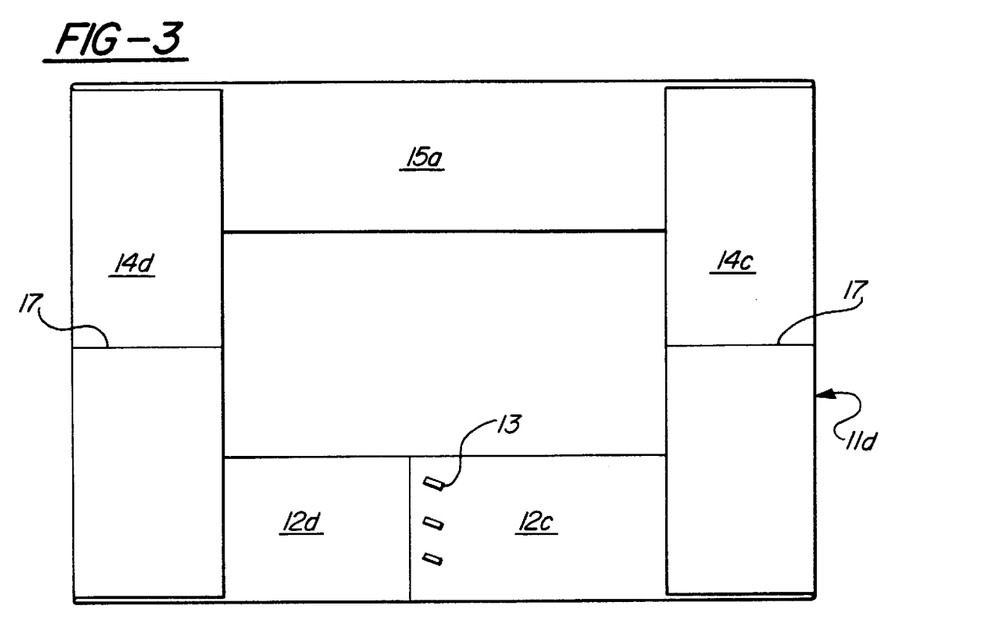
FIG. 3 is a top view of a packaging container of the invention with sealed edge flaps.
Figure 4:
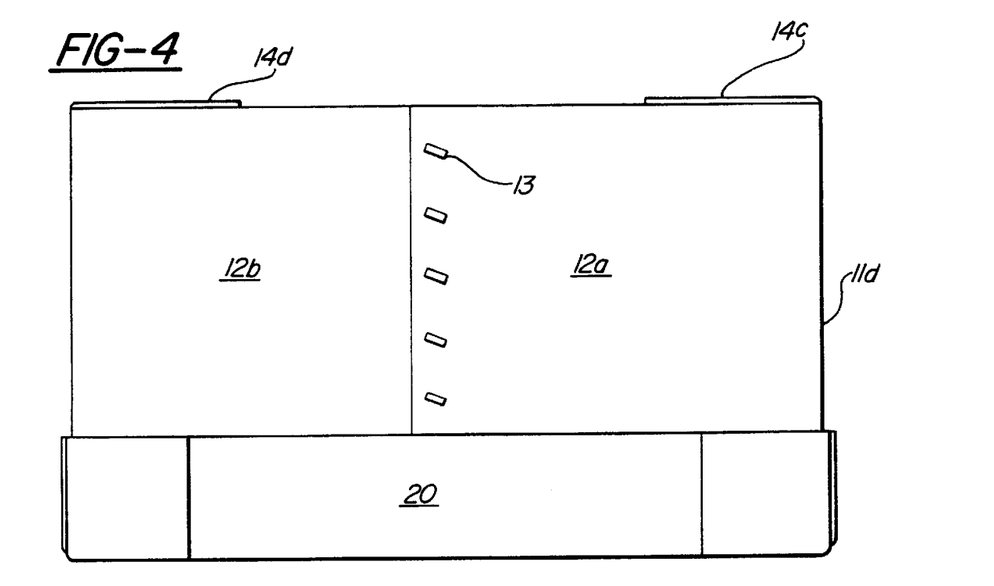
FIG. 4 is a side view of a packaging container of the invention showing a deployed sleeve within a tray, with opposing sealed end edge flaps at the sleeve top.
Figure 5:
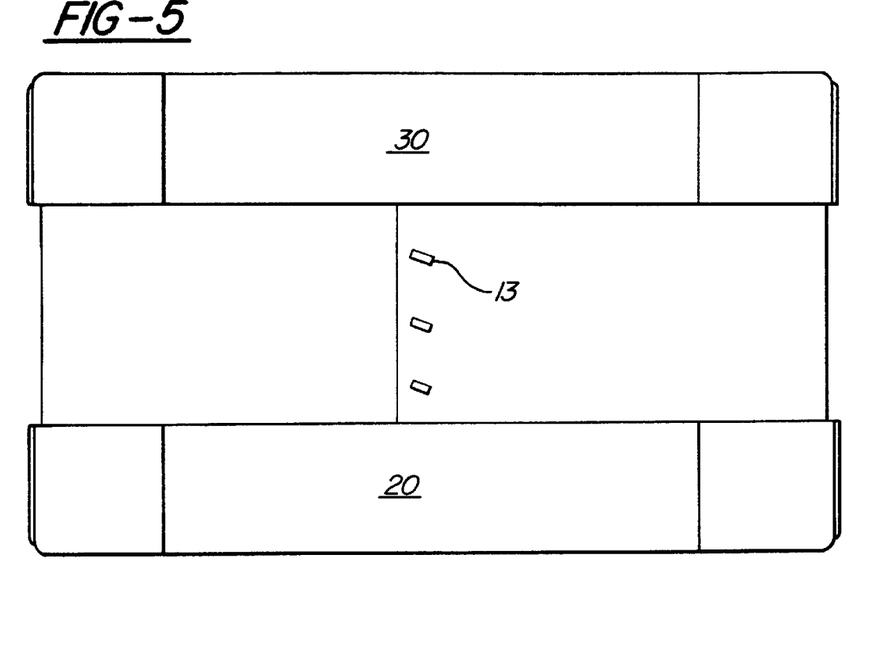
FIG. 5 is a side view of a packaging container with assembled cover and tray members.

A deployed sleeve packaging container 11d in preferred embodiments is provided with deployed and secured package stiffening edge flaps 12c, 12d, and top edge flaps 14c, 14d (FIG. 3). The container presents in side view (FIG. 4) as an upstanding sleeve with deployed edge flaps 14c, 14d telescoped within a tray 20 so that the sleeve lower margin 11b (FIG. 1) is in contact with the perimeter of the tray bottom. FIG. 5 shows a similar view of a deployed container 11d telescoped within a tray 20 and tray cover 30.

Figure 6:
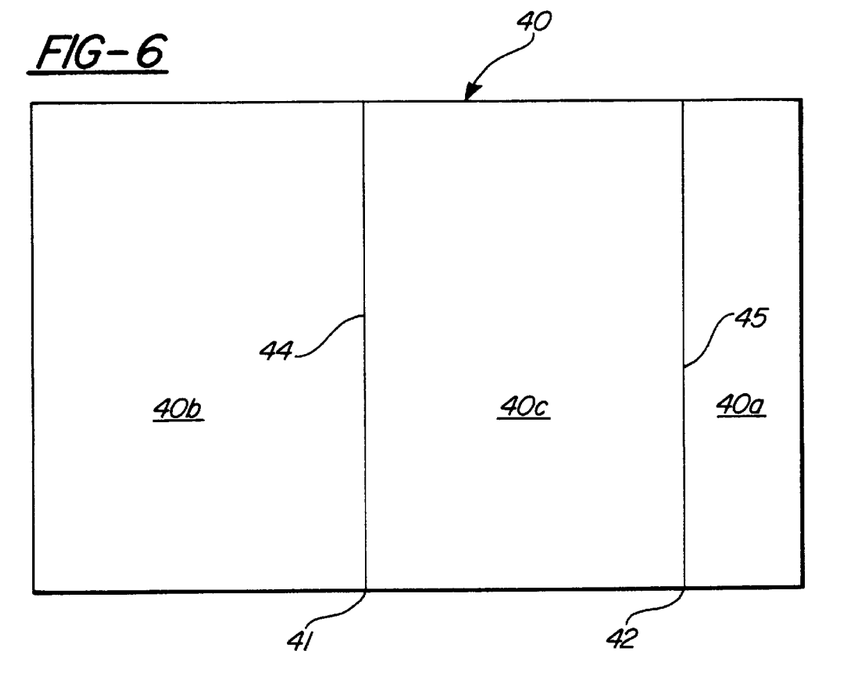
FIGS. 6, 6A, 6B, and 6C are plan views of hinge guide blanks according to preferred embodiments of the invention.

A hinge guide blank 40 in a preferred embodiment is provided (FIG. 6) having a hinge guide comprising a guide arm panel 40a, a guide base panel 40b, and a guide link panel 40c, hinges 41, 42, and panel score/fold lines 44, 45.

Figure 6A:
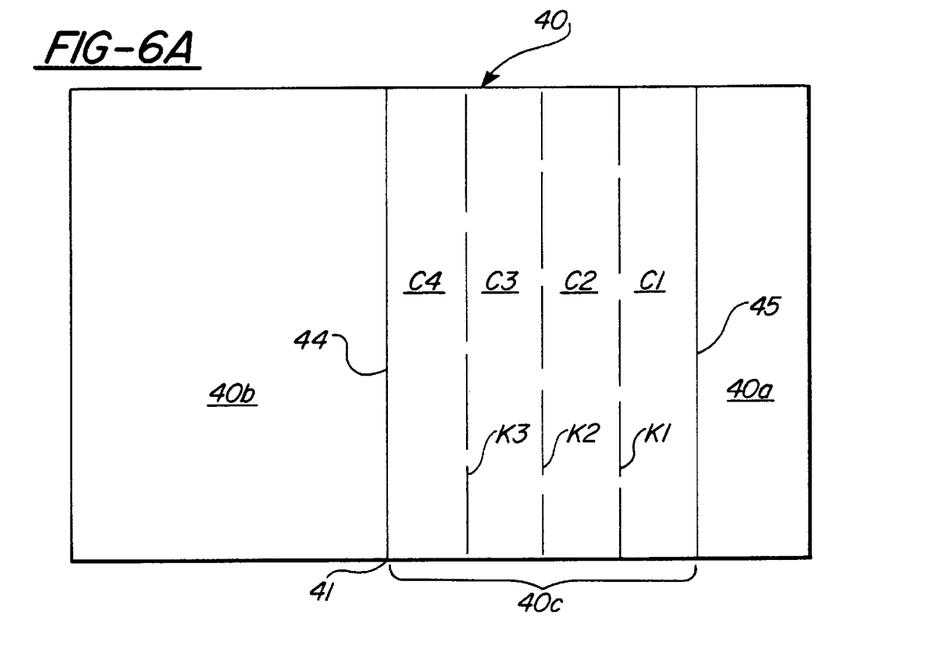

Another preferred hinge guide blank 40 is provided (FIG. 6A) having a guide arm panel 40a, a guide base panel 40b, and a link panel 40c comprising score/fold lines K1, K2, K3 that divide the link panel into as many panel segments C1, C2, C2, C4. The segments in turn are pivotable with respect to adjoinable panels such that when the hinge guide arm panel is attached to the sleeve at the sleeve bottom segment 15c (FIG. 1) and the base panel is attached to the tray bottom, the length of the link panel can be manually adjusted to achieve the desired degree of horizontal deployment of the container sleeve by pivoting the panels.

Figure 6B:
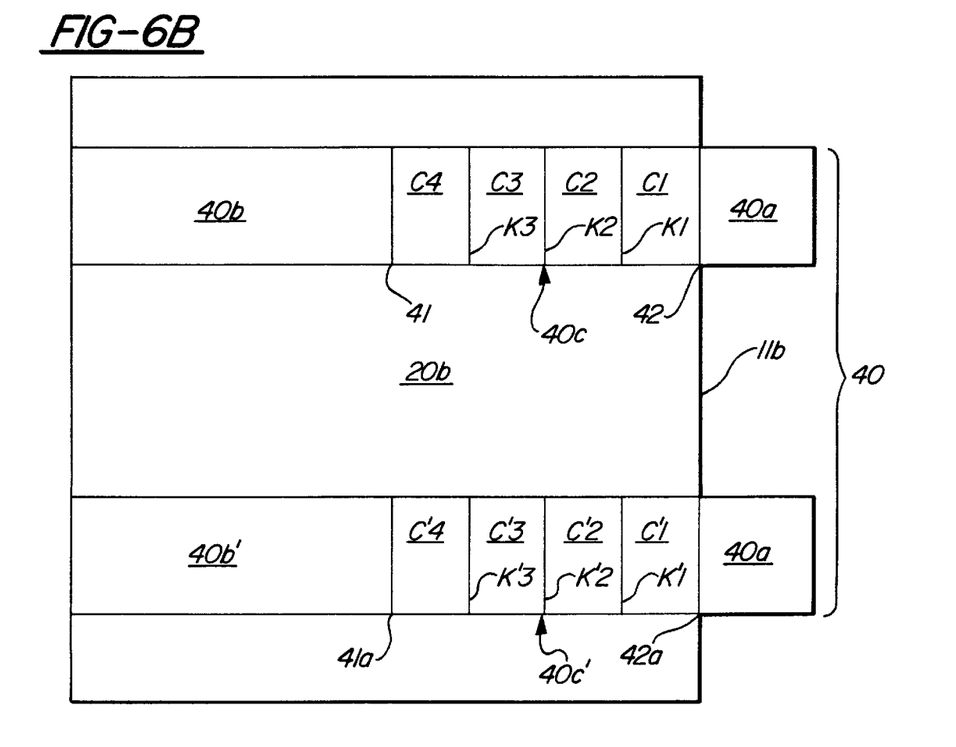
Figure 6C:
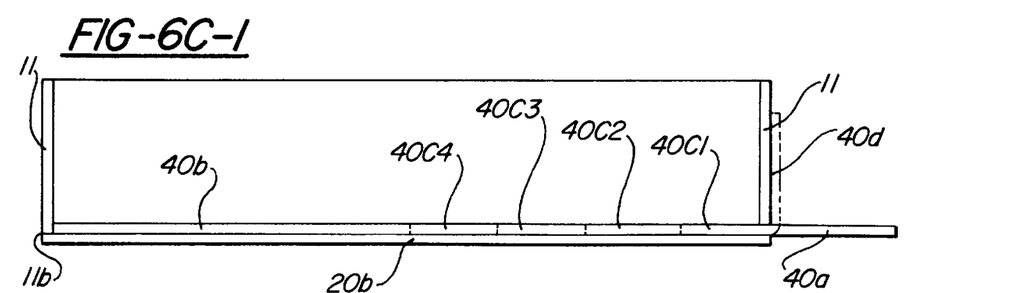
Figure 6C:
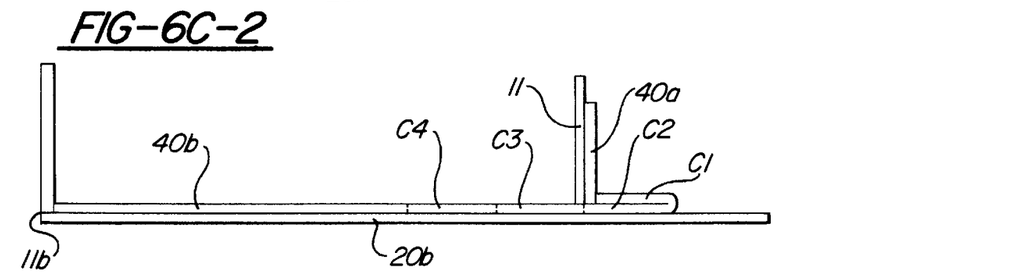
Figure 6C:
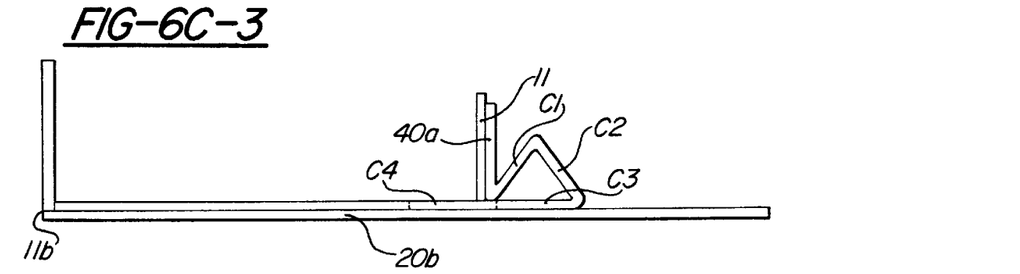
Figure 6C:
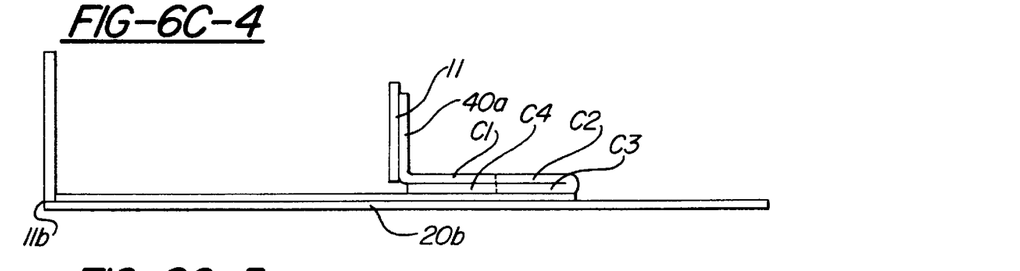

Thus, without any pivoting of the link panel, the container sleeve can be hinge guidably installed in full deployment in the available width of the container tray. Also, with the pivoting of each link panel segment C1, etc., degree of open sleeve deployment can be diminished in stages and thus selectively controlled to accommodate to the width dimension of the article to be packaged in the container. This serves to facilitate the packaging and shipment of different width articles within the container sleeve. In FIG. 6/1 where the link segment panels C1–C4 are unpivoted, the full width of the tray is provided, e.g., 15 ¼ inches. Where successive combinations of arm segments are pivoted, the following width dimensions of the resulting part collapsed sleeve in the tray is e.g., as follows:

| FIG. 6C View | Arm Panel Segments Pivoted | Deployed Container Sleeve Resulting Width |
|---|---|---|
| 6C-2 | C1, C2 | 11 inches |
| 6C-3 | C1, C2, C3 | 9.5 inches |
| 6C-4 | C1, C2 over C 3, C4 | 7.5 inches |

-continued

Figure 6C:
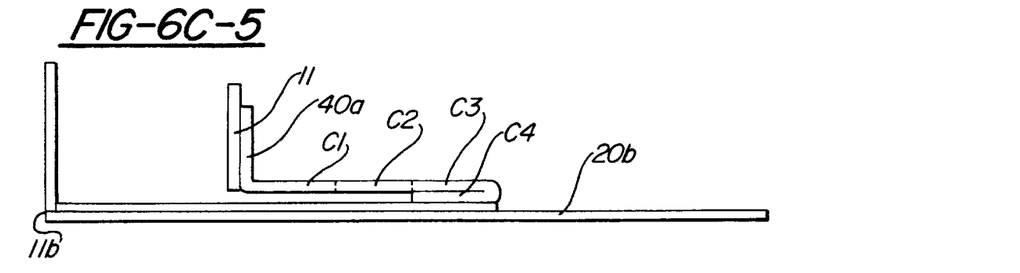

| FIG. 6C View | Arm Panel Segments Pivoted | Deployed Container Sleeve Resulting Width |
|---|---|---|
| 6C-5 | C1, C2, C3 over C4 | 3.5 inches |

Still another preferred hinge guide 40 is provided (FIG. 6B) that has two or more parallel hinge guide strips illustrated as having arm panels 40a, 40a', base panels 40b, 40b' and link panels 40c, 40c'. In a preferred embodiment, the link panels may be undivided or may be divided into segments, e.g., segments C1–C4, C'1–C'4, by score/fold lines whose function is described above. The hinge guide base panels 40b, 40b' are attached to a container tray bottom 20b such that the hinges 41, 41a coincide with the length centerline of the tray bottom and further such that a container sleeve in full open deployment is preferably attached to the outside surface of the arm panels 40a, 40a' with the sleeve lower margin 11b in close alignment with the hinge fold lines 42, 42a. The length of the hinge guide base panel and link panels of the above mentioned guide strips pair are equal and leave sufficient space within the perimeter of the tray bottom to enable collapsing and deployment of the container sleeve; the outermost width of the guide strip pair, e.g., 12 inches, can be the same as the preferred width of the FIG. 6A hinge guide 40.

Advantageously, for the container packaging of larger or taller articles using a suitably tall sleeve for a given matching tray of suitable size, the connecting guide hinge should have a link panel means that is segmented as described and should have a sufficient number of segments in the link panel means such that the open sleeve can be lifted high enough over the open tray to allow the article or items in question to be put into the tray without obstruction from the sleeve. For example, the link panel, instead of having four link panel segments as described, should have eight such link panel segments, and the base panel should match the link panel in length.

The guide hinge material preferably is any suitable fiberboard or paperboard material and may be a composite synthetic/fiberboard/paperboard panel material or equivalent material. The material can be of single ply or multiple plies. A two-ply corrugated fiberboard is preferred.

The packaging containers of the invention may as specified have a unitary or non-unitary pallet support but do not require a pallet for support. The non-pallet containers can be machine lifted by means of a slip sheet or other conventional means. The containers in a preferred embodiment are used with a supporting pallet 50. Preferably the pallet is secured to the container by suitable means such as adhesive, staples or other conventional or equivalent means. These fully deployed packs or package containers may be stacked in multiples (2,3, etc.) depending on sizes and weight limits, but still only requiring one pallet under the bottom package. Conventional package containers cannot be handled in this manner.

Figure 7:
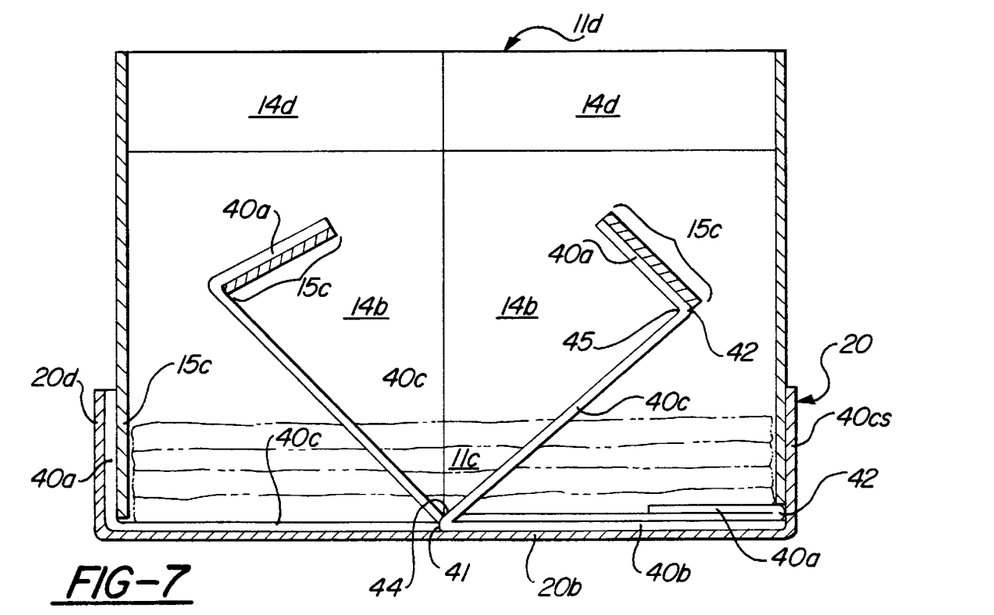
FIG. 7 is a schematic view of a sleeve both in collapsed form and in upstanding deployed form in a tray together with a guide member that is hingeably pivotable at one end and is secured at one face to the bottom portion of a tray shown in cross section taken on line 2B—2B of FIG. 2C and also that is hingeably pivotable at the other end, said other end being secured at its face to the sleeve bottom panel segment.

A deployed collapsible packaging container sleeve 11a in a preferred embodiment is attached at its sleeve bottom panel segment 15c (FIG. 7) to the arm panel 40a of hinge guide means comprising the arm panel a base panel and link panel means. The container sleeve 11a by the attachment of its bottom panel 15c to the hinge guide arm panel 40a enables the opening and deployment of the sleeve from a collapsed form 11c within the tray to an upstanding and upright position 11d within the periphery of the tray. As shown in FIG. 7, when the guide means are first hingeably articulated from the collapsed form to a "2 o'clock" position, the bottom panel segment 15c is disposed above the arm panel 40a and by continuing movement is articulated to the "10 o'clock" position where the panel segment 15c is reversed and is now below the arm panel due to the reverse hingeability of the hinge structure. This in consequence enables the arm panel 40a to be brought down finally into the desired package set-up position with the bottom panel segment 15c abutting the tray end wall 20d so that the sleeve assumes the deployment position. If appropriate, the open package container then is covered with a tray cover 30 for shipment or storage.

Figure 8:
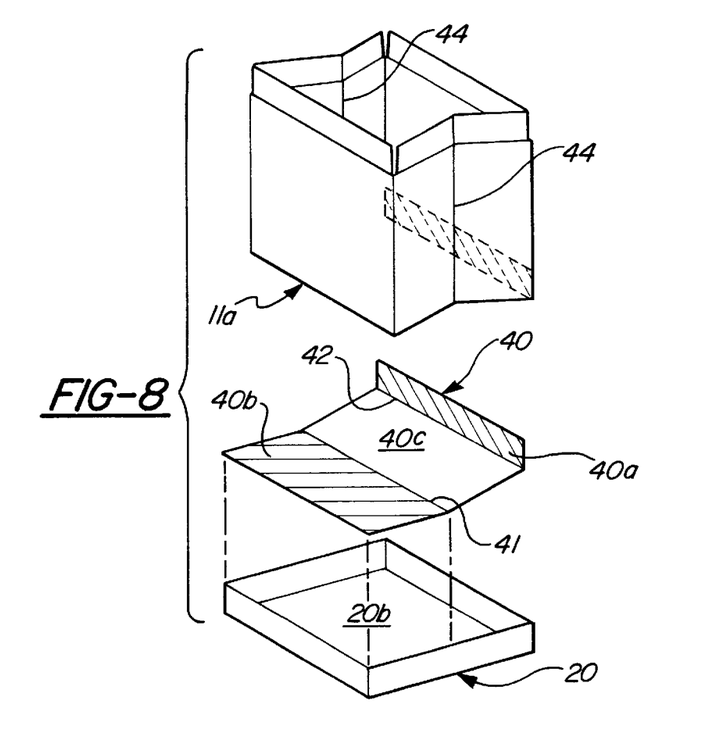
FIG. 8 is a view depicting in a preferred embodiment the assembly of an open tray with the base and link panels of a guide member fully covering the tray bottom, and with the guide arm panel being attached to the exterior lower margin of the open container sleeve.

Another preferred embodiment of the invention is a packaging container comprising in assembly a tray 20, a tray bottom 20b, a hinge guide comprising an arm panel 40a, a base panel 40b, and a link panel 40c, first hinge 41, second hinge 42, and a container sleeve 11a, shown in schematic view (FIG. 8). The container sleeve has inside and outside surfaces. The base panel 40b and the link panel 40c are dimensioned to fully cover, i.e., match fit the dimensions of the tray bottom 20b, and the panels 40b, 40c are dimensioned to match each other when folded together on fold tine 41. The inside surface of the hatched area 40a of the arm panel is assembled by gluing to the outside hatched area of the sleeve coinciding with the full length of the lower sleeve side margin. The base panel hatched area 40b in assembly is glued or stapled to the bottom of the tray and may include stapling through the tray bottom 40b to an underlying machine liftable support pallet (not shown).

In a preferred embodiment of the invention a packaging container is provided (FIGS. 9 and 10) comprising a tray blank, a tray member bottom panel comprising an arm panel 40a, a base panel 40b, and a link panel 40c, a reversibly collapsible and deployable sleeve 11 dimensioned when collapsed to fit in collapsed form within the blank-assembled tray and when deployed, to fit in open upstanding form at its sleeve lower margin 11b seated peripherally within the tray. The tray member bottom panel 15 is formed as a sleeve guide having hinges 41, 42 hingeably connecting the tray and sleeve and permitting the sleeve in collapsed form in the tray to be opened, deployed and lifted guidably out of the tray on a hinge-controlled path to an open upright or upstanding position in supported relation within the tray (for package set-up and shipping) and when appropriate further permitting the deployed sleeve to be emptied of its shipped content and returned on the controlled path and caused to be collapsed within the open tray. If desired, the open tray can be closed with a tray cover and set aside for stacking and re-use. The tray blank and sleeve each have inside and outside surfaces, and the inside of the arm panel 40a for container assembly is attached to the outside of the sleeve bottom segment so that for full deployment of the sleeve in the formed tray, the arm panel 40a is match fitted within the opening established by the transom 40t and the supporting columns 40cp, 40cp, as illustrated in FIG. 10.

Figure 9:
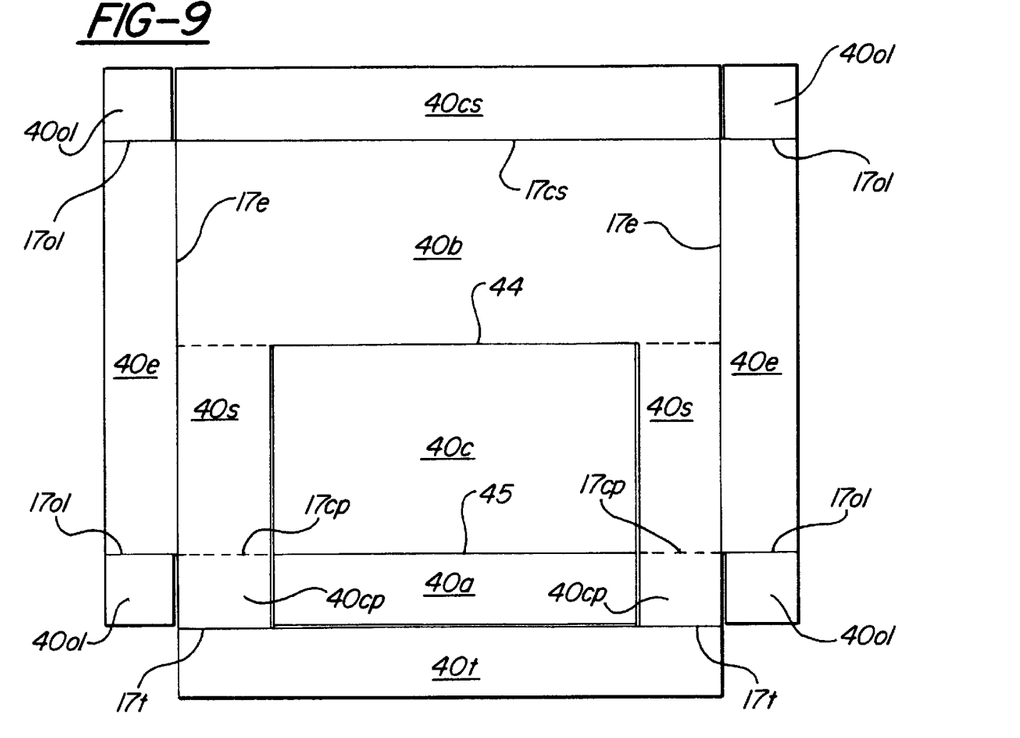
FIG. 9 is a plan view of a container tray blank in a preferred embodiment that provides both a tray function and a dual hinge guide function for a hinge-guideable container sleeve.
Figure 10:
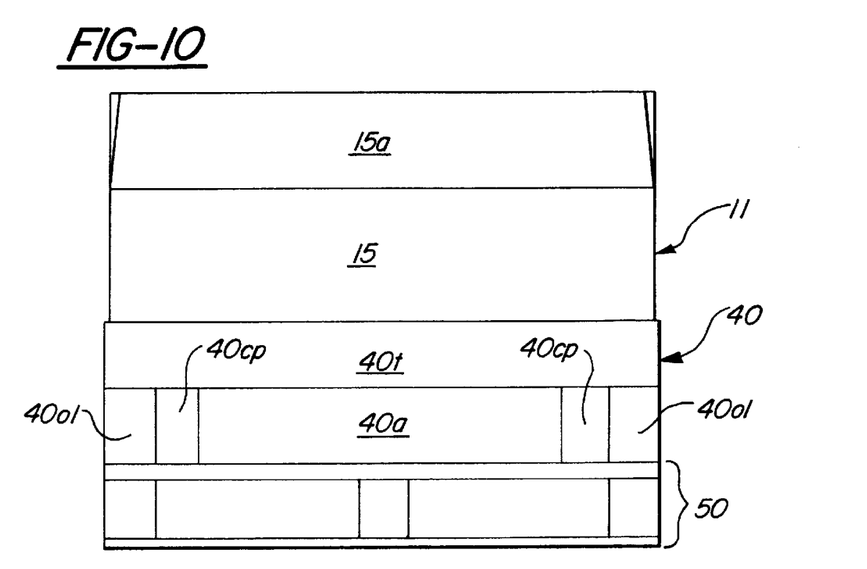
FIG. 10 is a side view of a packaging container of the invention made from a tray blank as in FIG. 9 for support of an upstanding or deployed sleeve and attachment of its base panel to an underlying support pallet.

Another preferred embodiment of the invention is the container tray blank itself (FIG. 9). The tray blank which is preferred as a two-ply fiberboard panel comprises a tray bottom that includes a base panel 40b and unitary side panels 40s, 40s. The tray bottom is joined at a guide hinge fold line 44 enabling a first hinge 41 with a flap or tongue portion comprising a link panel 40c that in turn is joined at a second guide hinge fold line 45 (enabling a second hinge 42) with an arm panel 40a. The arm panel is intended to be attached by suitable means to a hinge guideable container sleeve dimensioned to match fit within the perimeter of the tray when set up from the tray blank for successive deployment and collapse of the sleeve. These panels 40a, 40b, 40c hingeably articulate with each other as part of the tray member that allows repeated cycles of deployment and collapse of the container sleeve according to the invention. Separated by fold lines from the tray bottom portion are unitary tray end panels 40e, 40e, collapse side panel 40cs, column panels 40cp, 40cp, and a transom panel 40t. The fold lines are respectively 17e, 17cs, 17cp and 17t. The end panels 40e each include an overlap panel 40ol which folds at right angles on fold line 17ol. When the sleeve is guidably articulated to the outer margin 17cs of the base panel 40b, the sleeve is caused to collapse within the tray. When the sleeve is articulated to the outer margin of the link panel 40c, the sleeve is caused to be deployed in upstanding open form supported from the perimeter of the tray. As indicated, the tray end panels 40e, 40e each have opposing overlap panels 40ol and include fold lines that enable the end panels 40e, 40e and side panel 40cs, to be set up at right angles to the tray bottom portion to form a part tray and further enable the overlap panels 40ol to be folded again at right angles as opposing box corners for laminating the overlap panels to the outside surface of the adjacent tray column panel members 40cp and side panel 40cs by suitable attachment preferably with adhesive.

It will be apparent to those skilled in the art that in the light of the foregoing disclosure and drawings, many alterations and modifications are possible in the practice of the invention without departing from the spirit and scope of the invention defined in the following claims.

I claim:

1. A packaging container comprising:
   an open-face tray member having a tray member bottom panel;
   a collapsible and deployable sleeve, dimensioned when collapsed to fit in collapsed form within said tray member, and when opened and deployed to fit in open upright form in the tray bottom panel,
   guide means having plural hinges hingeably connecting said tray member and sleeve and permitting said sleeve in collapsed form to be opened, deployed and lifted guidably out of the tray member on a hinge-controlled path to an open upright deployment position in tray supported relation within the tray member and further permitting said deployed sleeve to be returned on said path and caused to be collapsed within the open tray member.

2. A packaging container as in claim 1 comprising an open-face cover member wherein the cover member and the tray member are matched for engagement together in face-to-face relation to provide an interior cavity large enough to accommodate enclosure therewithin of said sleeve when collapsed.

3. A packaging container as in claim 2 wherein the cover member engages the tray member in telescopic relation.

4. A packaging container as in claim 1 wherein the sleeve when collapsed has a bottom panel, a top panel, and opposing end panels closely folded together in panel-to-panel relation and when deployed has an upstanding tray-supported open configuration matching the opening of the open tray member.

5. A packaging container as in claim 4 wherein the guide hinge means comprise a panel member having a first fold line conforming with an edge of the sleeve and a second fold line centered in the tray bottom panel and being parallel to the first fold line such that in a containment, storage or transportation mode the sleeve by the guide hinge means can be centrally deployed over and hingeably match fitted in open tray-supported upright registry in the tray member.

6. A packaging container as in claim 4 wherein the hinge means comprise a fold line to guidably accommodate pivoting, centering, lowering and collapsing of the sleeve into the tray member.

7. A packaging container as in claim 4 wherein the end panels of the fiberboard sleeve are each bisected by a fold line so that the sleeve is compressible from an open form to a collapsed form.

8. A packaging container as in claim 4 wherein the deployed sleeve panels comprise a peripheral edge flap fold line and an edge flap formed on said fold line of at least one of said panels by folding the edge flap at right angles to the respective panel such that the opposing ends of said edge flap bear upon and keep the opposing bottom and top panels from collapsing.

9. A packaging container as in claim 8 wherein four edge flaps are formed and the respective ends thereof bear upon and keep the opposing panels from collapsing.

10. A packaging container as in claim 9 covered by an open face cover member.

11. A packaging container as in claim 1 wherein said tray member comprises an open face panel and said guide means comprise an arm panel, a base panel, and a link panel.

12. A packaging container as in claim 11 wherein the link panel comprises link panel segments.

13. A packaging container as in claim 11 wherein the link panel comprises parallel guide link panels.

14. A packaging container as in claim 11 wherein the container sleeve is attached to the link panel outside surface.

15. A packaging container as in claim 11 wherein the hinge guide link panel means is segmented and includes sufficient segments in the link panel to allow the sleeve to be lifted guidably out of the tray to a position allowing the container contents to be placed in the tray without obstruction from the sleeve.

16. A packaging container as in claim 11 wherein said base panel and said link panel are in matching engagement in collapsed form.

17. A packaging container as in claim 16 wherein said base panel and said link panel dimensionally match the open face of the tray bottom panel when the sleeve is in collapsed form within the tray member.

18. A packaging container as in claim 11 wherein said arm panel at its inside surface is connected to the outside surface of said sleeve.

19. A packaging container as in claim 11 wherein said base panel is attached to the tray bottom panel.

20. A packaging container as in claim 11, wherein said tray member is mounted on a pallet.

21. A packaging container comprising:

an open-face tray member and tray member bottom panel;

a reversibly collapsible and deployable sleeve, dimensioned when collapsed to fit in collapsed form within said tray member, and when deployed, to fit in tray-supported open upstanding form in the tray member, said bottom panel being formed as a sleeve guide means having first and second hinges hingeably connecting said tray member and sleeve and permitting said sleeve in collapsed form to be opened, deployed and lifted guidably out of the tray member on a hinge-controlled path to an open upright deployment position in tray supported relation in the tray member and further permitting said deployed sleeve to be returned on said path and caused to be collapsed within the open tray member.

22. A packaging container as in claim 21 comprising an open-face cover member wherein the cover member and the tray member are matched for engagement together in face-to-face relation to provide an interior cavity large enough to accommodate enclosure therewithin of said sleeve when collapsed.

23. A packaging container as in claim 21 wherein the sleeve when collapsed has a bottom panel, a top panel, and opposing end panels and when deployed has an upstanding open perimeter configuration matching the opening of the open tray member.

24. A packaging container as in claim 21 comprising a pallet.

25. A container as in claim 21 wherein the pallet is attached to the tray member.

26. A container as in claim 25 wherein the pallet is adhesively attached to the tray member.

27. A container as in claim 25 wherein the pallet is stapled to the tray member.

* * * * *